US008806441B2

(12) United States Patent
Chandra et al.

(10) Patent No.: US 8,806,441 B2
(45) Date of Patent: Aug. 12, 2014

(54) STATIC CODE ANALYSIS

(75) Inventors: Satish Chandra, White Plains, NY (US); Pankaj Dhoolia, Uttar Pradesh (IN); Mangala Gowri, III, New Delhi (IN); Monika Gupta, New Delhi (IN); Rudrapatna Kallikote Shyamasundar, Mumbai (IN); Saurabh Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 12/493,511

(22) Filed: Jun. 29, 2009

(65) Prior Publication Data
US 2010/0333069 A1 Dec. 30, 2010

(51) Int. Cl.
G06F 9/44 (2006.01)

(52) U.S. Cl.
USPC ......................................................... 717/126

(58) Field of Classification Search
USPC ........................................ 717/128, 131, 126
See application file for complete search history.

(56) References Cited

U.S. PATENT DOCUMENTS

| 7,127,705 | B2 | 10/2006 | Christfort et al. | |
|---|---|---|---|---|
| 2005/0015752 | A1* | 1/2005 | Alpern et al. | 717/131 |
| 2007/0089092 | A1 | 4/2007 | Schmidt et al. | |
| 2009/0044177 | A1* | 2/2009 | Bates et al. | 717/131 |
| 2009/0077542 | A1* | 3/2009 | Chou et al. | 717/132 |
| 2013/0198725 | A1* | 8/2013 | Chou et al. | 717/132 |

OTHER PUBLICATIONS

Dalci et al., "A framework for creating custom rules for Static Analysis tools", Cigital, 2006, 6 pages.*
Meng et al., "An Approach to Merge Results of Multiple Static Analysis Tools", IEEE, 2008, 6 pages.*
Sonar, "Sonar in a nutshell", Codehaus.org, Feb. 2009.*
Schilling et al., "Integrate static analysis into a software development process", EE Times, 14 pages.*
Heckman et al., "Automated Adaptive Ranking and Filtering of Static Analysis Alerts", IEEE, 2006, 2 pages.*
Duncan, "Creating a custom dictionary for code analysis in VS 2008", Duncan's Blog, 2008, 3 pages.*
Xiao et al., "Performing High Efficiency Source Code Static Analysis with Intelligent Extension", IEEE, Dec. 2004, pp. 346-355.*
Canfora et al., An Extensible System for Source Code Analysis, IEEE Transactions on Software Engineering, vol. 24, Issue: 9, Sep. 1998.
Schilling, Jr., Modeling the Reliability of Existing Software Using Static Analysis. http://myweb.msoe.edu/~schilling/Publications/modeling_the_reliability_of_existing_software_using_static_analysis.pdf.
Veracode. Static Code Analysis. http://www.veracode.com/security/static-code-analysis.

* cited by examiner

*Primary Examiner* — John Chavis
(74) *Attorney, Agent, or Firm* — Ryan, Mason & Lewis, LLP

(57) ABSTRACT

Techniques for static code analysis are provided. The techniques include routing a code analysis request to a set of one or more static code analysis tools based on a context of the request, merging one or more tool-specific outputs of the code analysis, wherein merging the one or more tool-specific outputs comprises using one or more tool-specific mappings to one or more static code analysis abstractions and one or more source linkages of one or more static code analysis defects, performing a deep analysis on a set of one or more defect categories, and combining results of the merging with the deep analysis to filter out one or more false-positives and to add one or more new true positives to create an optimal set of defects.

20 Claims, 19 Drawing Sheets

1802

STATIC CODE ANALYSIS

FIELD OF THE INVENTION

Embodiments of the invention generally relate to information technology, and, more particularly, to static code analysis.

BACKGROUND OF THE INVENTION

Challenges exist in contemporary static code analysis approaches. For example, existing static code analysis tools report a large percentage of false positives that adversely impact the role of static code analysis in software quality. Also, existing static code analysis tools require end-users to be aware of a tool's internals (that is, setup process, configurations, and its terminology), adversely impacting consumability.

Additionally, existing static code analysis tools do not offer visualizations of the actual code-patterns that have led the tool to report a defect to the user. This, consequently, leaves a gap in empowering a user to take an intelligent judgment on whether a reported bug presents a scenario that can cause a severe impact on code quality. Further, existing static code analysis tools do not offer supporting user feedback and learning from user actions and feedback so as to be more adaptive to user needs.

SUMMARY OF THE INVENTION

Principles and embodiments of the invention provide techniques for static code analysis. An exemplary method (which may be computer-implemented) for static code analysis, according to one aspect of the invention, can include steps of routing a code analysis request to a set of one or more static code analysis tools based on a context of the request, merging one or more tool-specific outputs of the code analysis, wherein merging the one or more tool-specific outputs comprises using one or more tool-specific mappings to one or more static code analysis abstractions and one or more source linkages of one or more static code analysis defects, performing a deep analysis on a set of one or more defect categories, and combining results of the merging with the deep analysis to filter out one or more false-positives and to add one or more new true positives to create an optimal set of defects.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
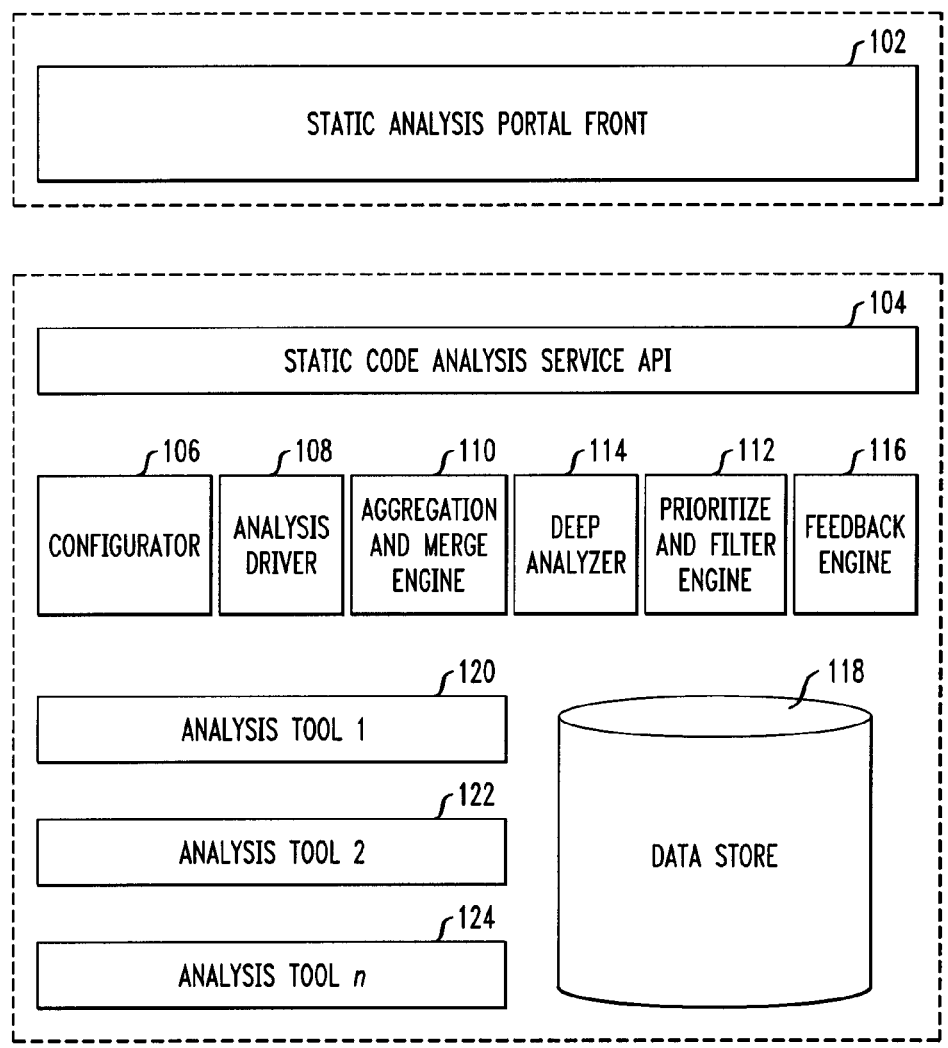
FIG. 1 is a diagram illustrating system architecture, according to an embodiment of the invention.

Principles of the invention include a novel combination of shallow and deep static code analysis in a tool-transparent, feedback-driven, and adaptive static code analysis service. One or more embodiments of the invention include a static code analysis apparatus that offers static analysis as a service, wherein the apparatus can be primed with static code analysis abstraction vocabulary, empirical prioritization of the relevant items of the vocabulary, static analysis tools, tool-specific vocabularies to static code analysis abstraction mappings and user directories.

One or more embodiments of the invention provide a novel combination of shallow and deep static code analysis and package it as a service. The techniques can include, for example, routing a code analysis request to a set of static code analysis tools based on a context of the request, and merging tool-specific outputs of the code analysis, wherein merging the tool-specific outputs includes using tool-specific mappings to static code analysis abstractions and source linkages of static code analysis defects.

Also, the techniques detailed herein include performing a deep analysis on a select set of defect categories wherein the chosen categories are critical from the perspective of fixing the defects. Shallow static code analysis on these categories leads to a high-volume of false positives, and shallow static code analysis is likely to miss out of difficult to find true positives. One can combine the results of the merging with the deep analysis to filter a high percentage of false-positives and add new true positives to present an optimal set of defects to the user.

The techniques detailed herein include facilitating creation of projects, creation of builds for projects, as well as upload or association of source and/or binary packages for builds. One or more embodiments of the invention also facilitate creation of named analysis configurations from static code analysis abstractions, and their scoped association to projects or across projects. Further, one or more embodiments of the invention can facilitate launching static code analysis requests for a chosen set of builds using a corresponding chosen set of named-analysis-configurations.

Static code analysis requests can be routed to a configured set of shallow static-analysis tools based on the context of the request. On successful completion of analysis by the tools, one or more embodiments of the invention can merge the tool-specific output using tool-specific mappings to static code analysis abstractions and the source linkages of the static code analysis defects. The techniques described herein can additionally filter reported merged defects based on the empirical prioritization with which the apparatus has been primed, the user-feedback on the reported defects in previous analysis-runs, and defect relevance trend-analysis based on user-feedback and configurations across users and projects.

Also, one or more embodiments of the invention can carry-out a deep pass code-analysis analysis corresponding to a set of select categories. Categories for deep analysis are chosen such that they are critical from the perspective of fixing the defects. Shallow code analysis on these categories leads to a high-volume of false positives, and shallow code analysis is likely to miss out of difficult to find true positives. Deep code analysis results are used to filter out false-positives and merge new true-positives from/into the previous shallow code analysis results.

One or more embodiments of the invention additionally facilitate users (for example, authenticated users) to provide feedback on the reported defects as well as code-navigation-based visualization of the code-patterns leading to the defects. This feedback can be used, for example, to provide a more relevant user-adapted prioritization and filtering of defects in subsequent analysis-runs.

One or more embodiments of the invention can include a web-based portal front, a representation state transfer (REST) based Service API, and its implementation. The techniques detailed herein also include a tool-agnostic static code analysis vocabulary that is an end-user-driven abstraction of code-analysis terms and concepts, masking the end-user from numerous variations of tool-specific terms and concepts. Additionally, the techniques described herein can accommodate various static-analysis-tools configurationally by providing a mapping of their vocabularies to the tool-agnostic static code analysis vocabulary. Also, multiple mapped static analysis tools can be run towards a static-analysis request, and then one can aggregate, map and merge tool-specific analysis-reports to the tool-agnostic static code analysis vocabulary.

One or more embodiments of the invention also include a generalized code-navigation scheme based on named-marker sets that describe a path of navigation thru the code in a generalized manner, as well as using the generalized code-navigation scheme and code-patterns to provide an end-user with a visualization of code-slices and their navigational paths that led to a static code analysis defect being reported.

One or more embodiments of the invention include capturing user-feedback on entities such as, for example, reported static code analysis defects and role and/or relevance of code-patterns leading to such defects. Direct and derived user-feedback (for example, selection of analysis-configurations (with which the users are running static code analysis or storing as named analysis-configurations for later use) can be used to adapt to a user's needs in filtering and/or prioritizing reported defects. Further, one or more embodiments of the invention include capturing tool-specific feedback that can be used by any of the underlying tools to improve the analysis results.

The techniques detailed herein include reducing false positives in static code analysis via a deep code analysis for a select set of categories and using a learning and adaptive scheme based on direct and/or derived user feedback for defect-prioritization and filtering. As described herein, one or more embodiments of the invention identify control-flow-based patterns, prioritize defects within a category, and, based on user feedback, use multiple features of defects (for example, defect patterns) and build classifiers for reprioritization defects. Additionally, given, for example, the defect reports for two versions of a program, the techniques described herein can compute deleted defects, new defects, and common defects by performing control-flow-based differencing of the two program versions.

One or more embodiments of the invention can include, by way of example only and not limitation, the following steps. For instance, an end-user can log-in to the system and see a list of linked projects as well as personal named-analysis-configurations. Named-analysis-configurations are a set of analysis types that the end-user has grouped together on some logical basis and wishes to re-use across builds within the same project or across projects. Also, the end-user can create either of the above mentioned entities (that is, a project or a named-analysis-configuration), and the named-analysis-configurations can be created across projects or within the scope of a project. Once the end-user creates a project, new builds can be created in the scope of that project. A build is a set of source and/or binary packages that are directly uploaded or derived from configurations describing the uniquely identifying details of a source control repository and build-scripts.

Once a build is created and source and/or binary packages are associated to that build, an end-user can run an analysis on the build. For example, in one or more embodiments of the invention, the end-user can choose more that one build and more than one analysis configurations to run on those builds. Upon the end-user's running the analysis with a set of chosen builds from a project and a corresponding set of analysis-configurations, a request processor receives the analysis requests and looks at the configurations to select the right set of static code analysis tools and runs them.

Once the static code analysis tools have all reported their completion, an aggregation and merge engine selects static code analysis abstractions to specific tool mappings and applies them to convert tool specific static code analysis defect reports to a common base (based on the aforementioned abstractions). The engine can then merge the abstractions while at the same time knocking off duplicates based on the defect-type and source-linkage combination.

One or more embodiments of the invention can apply a deep code-analysis corresponding to a set of select categories. Categories for deep analysis are chosen such that they are critical from the perspective of fixing the defects. Shallow code analysis on these categories leads to a high-volume of false positives, and shallow code analysis is likely to miss out of difficult to find true positives. Deep code analysis results are used to filter out false-positives and merge new true-positives from/into the previous shallow code analysis results. Additionally, one or more embodiments of the invention can apply a filter based on user-feedback and learning based on trend-analysis to filter-out false-positives, as well as apply prioritization based on empirical defect-analysis knowledge.

The techniques detailed herein further include reporting static code analysis defects as a report to the end-user. Depending on the combination (of builds and analysis-configurations) on which the end-user fired the analysis, there can be more than one reports listed for the end-user. The end-user can choose to view the details of a specific report, wherein the user can be presented with the filtered and prioritized report of defects. Using marker sets associated with the reported defects, a user may also view a visualization of the code leading to the defect.

As the end-user selects a defect (which may include, for example, simply hovering over the defect), a choice of feedbacks and/or the associated and/or identified code-patterns (if any) can also be presented to the user. Further, based on the end-user actions, feedback on the defect or on the code-patterns can be accepted to reflect immediate changes in the current report and for later use in the subsequent analysis.

FIG. 1 is a diagram illustrating system architecture, according to an embodiment of the invention. By way of illustration, FIG. 1 depicts a static analysis portal front 102, a static code analysis service application programming interface (API) 104, a configurator 106, an analysis driver 108, an aggregation and merge engine 110, a prioritize and filter engine 112, a deep analyzer 114 and a feedback engine 116. FIG. 1 also depicts a data store 118, as well as analysis tools 120, 122 and 124.

The configurator component 106 provides the ability to accommodate various existing static-analysis-tools configurationally by providing a mapping of their vocabularies to a tool-agnostic static-code-analysis vocabulary. The tool-agnostic static-code-analysis vocabulary is an end-user driven abstraction of code-analysis terms and concepts, masking the end-user from numerous variations of tool-specific terms and concepts. The configurator 106 also allows registering the capability and confidence associated to a particular analysis tool towards its support for a particular category in the code analysis vocabulary. An end-user of the static analysis service does not have to usually be aware of the configurator.

The analysis driver component 108 chooses the correct set of underlying static analysis tools applicable for the requested static analysis, federates the static-analysis job to these underlying static analysis tools, and assembles the response. It can make the choice of the underlying static analysis tools based on, for example, the initially registered capability for the tool towards the categories of analysis, the observed trends in terms of the false-positives detection, and the user-feedback in terms of acceptance or rejection of the identified bugs.

The aggregation and merge engine 110 unifies the assembled responses received for the federated static analysis performed by the underlying tools. It uses the mappings between the underlying tools' vocabularies and the common static analysis abstraction to do so. The aggregation and merge engine also filters out duplicates based on the defect-type and source-linkage combination.

The deep analyzer component 114 performs a deep static analysis for a select set of defect-categories. Primarily, these categories are important from the perspective of fixing defects, and have a lot of false positives from shallow static analysis performed by the underlying tools.

The prioritize and filter engine 112 performs a number of tasks. For example, it uses the deep analysis output to both filter out a lot of false positives post the aggregation and merge, as well as add new defects that may have been discovered new in the deep-analysis. Also, the prioritize and filter engine 112 applies a filter based on user-feedback and learning based on trend-analysis to knock-off further false-positives. Additionally, the prioritize and filter engine 112 applies prioritization based on empirical defect-analysis knowledge as well as observed personal trends in terms of defects and categories actually chosen for fixing.

The feedback engine 116 allows capturing user-feedback on entities such as, for example, reported static code analysis defects. The users can state things such as whether they will fix or ignore the defects, any remarks and/or directions for the fixers in relation to the defect, whether a particular category of defects should be prioritized low/high/ignored all together, etc. Analysis tools (for example, components 120, 122 and 124) can include, for example, typical code analysis tools that are common in the field.

The data store component 118 persists the information relevant from the perspective of the techniques detailed herein. It uses the disclosed schema as a data-model guidance in persistence. The static analysis portal front 102 is a web-based portal through which one or more embodiments of the invention are offered to end-users. Further, the static code analysis service API 104 is the programmable API that may be used in programmatic integrations with one or more embodiments of the invention.

Figure 2:
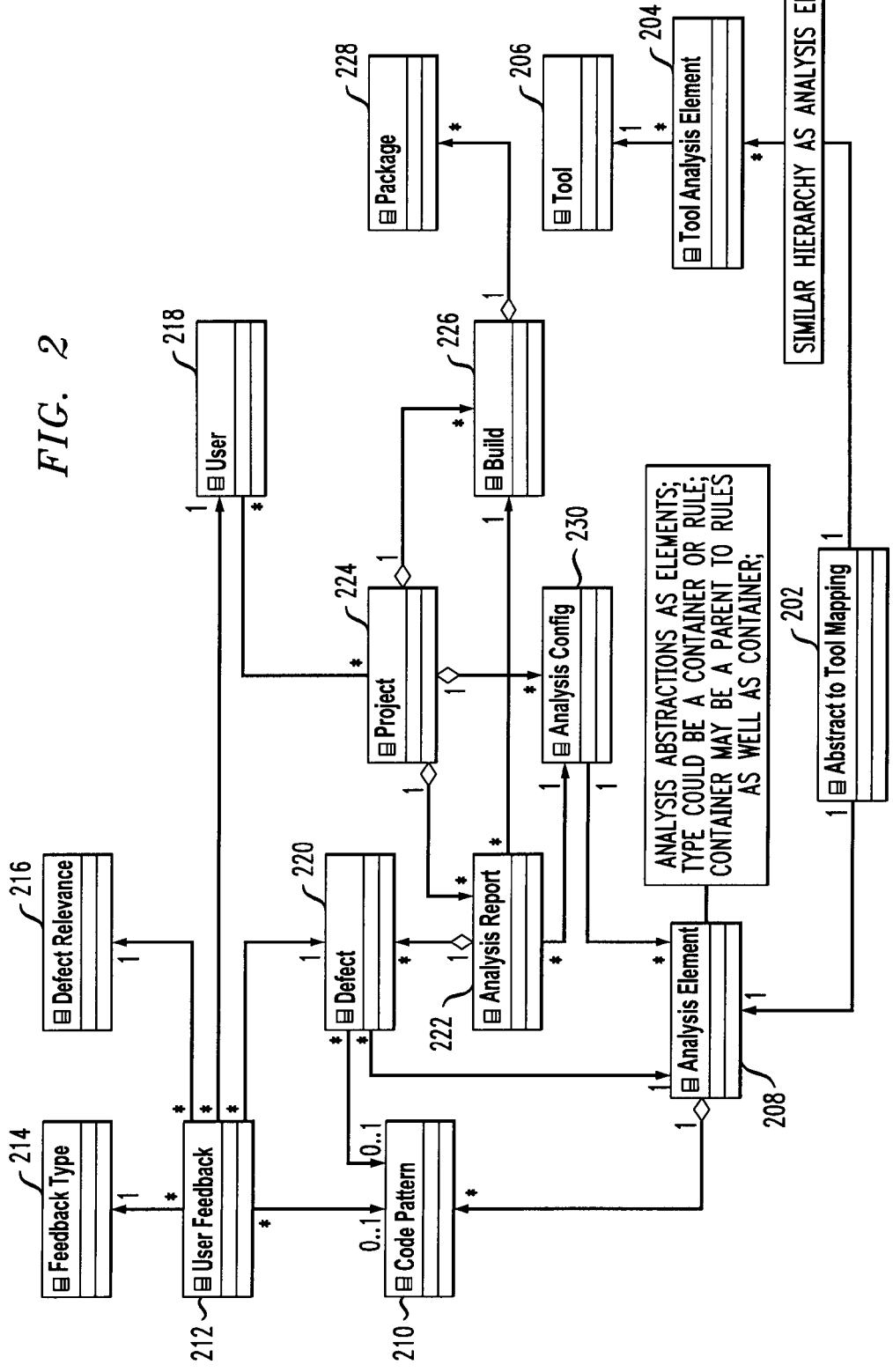
FIG. 2 is a diagram illustrating an entity relationship diagram of core architectural entities, according to an embodiment of the invention.

FIG. 2 is a diagram illustrating an entity relationship diagram of core architectural entities, according to an embodiment of the invention. By way of illustration, FIG. 2 depicts elements of abstract to tool mapping 202, tool analysis element 204, tool 206, analysis 208, code pattern 210, user feedback 212, feedback type 214 and defect relevance 216. FIG. 2 also depicts elements of user 218, defect 220, analysis report 222, project 224, build 226, package 228 and analysis configuration 230. As further detailed herein, FIG. 2 is an exemplary high-level entity relationship (ER) model used in one or more embodiments of the invention.

Figure 3:
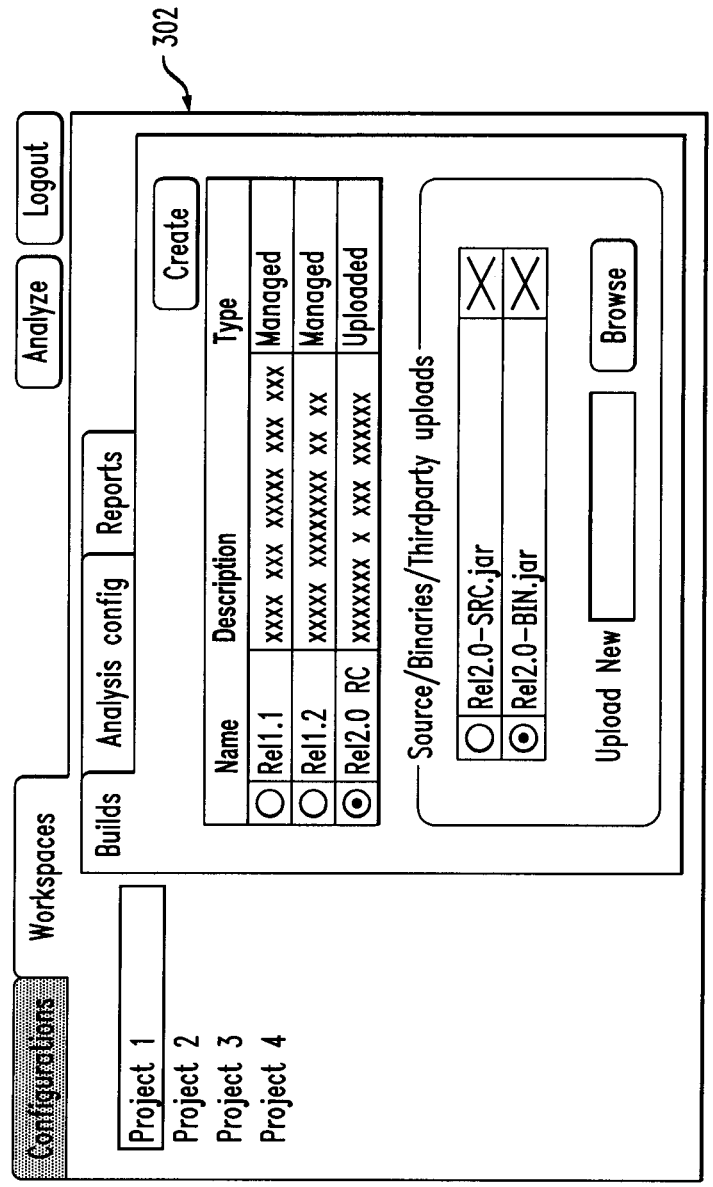
FIG. 3 is a diagram illustrating an end-user specifying build-configurations, according to an embodiment of the invention.
Figure 4:
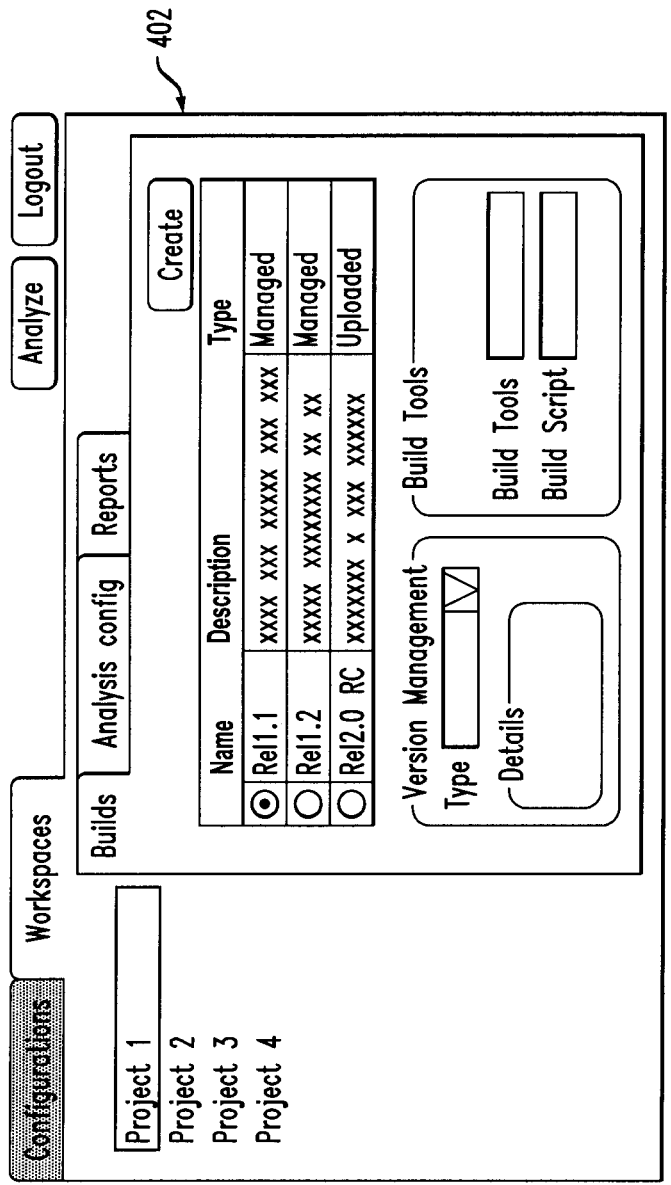
FIG. 4 is a diagram illustrating an end-user specifying build-configurations, according to an embodiment of the invention.

FIG. 3 is a diagram 302 illustrating an end-user specifying build-configurations, according to an embodiment of the invention, as described in further detail herein. FIG. 4 is a diagram 402 illustrating an end-user specifying build-configurations, according to an embodiment of the invention. As depicted in FIG. 4, this managed build configurations allows an end-user to just specify the type and (type-specific) details of the source control repository, and the details about building the build from a source using supported known build-systems (for example, Ant, Maven etc.). Additionally, using that information pulls from the source dynamically, builds it and uses it to perform static code analysis on it.

Figure 5:
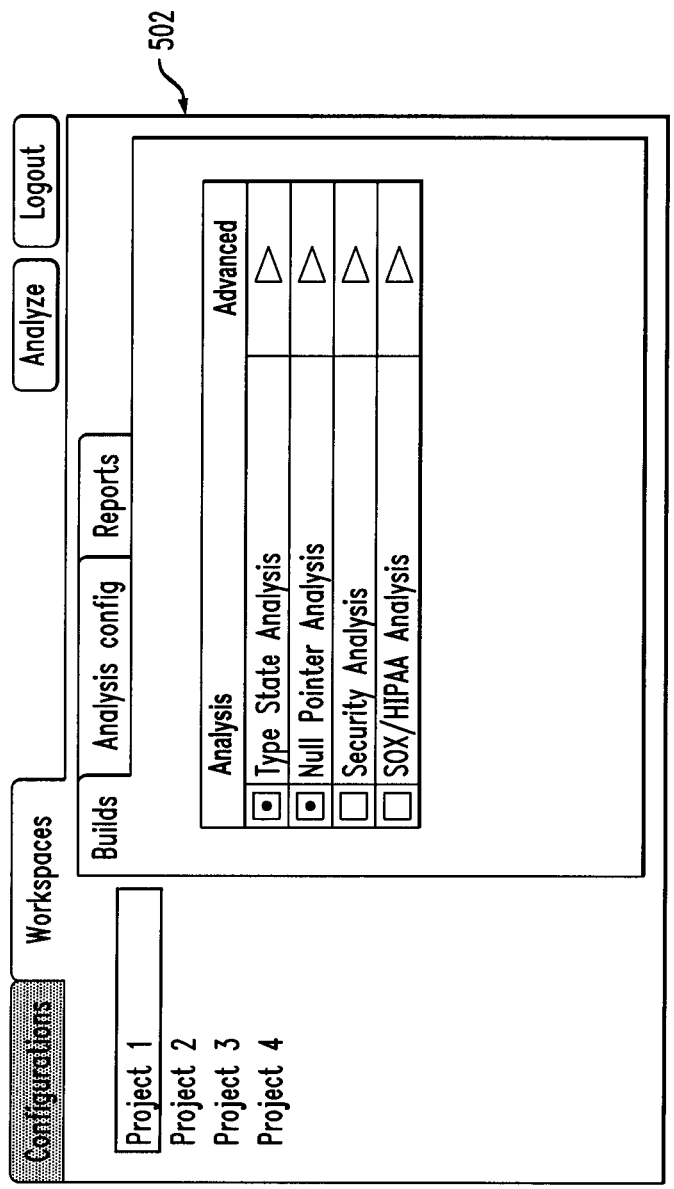
FIG. 5 is a diagram illustrating an end-user specifying named analysis configurations, according to an embodiment of the invention.
Figure 6:
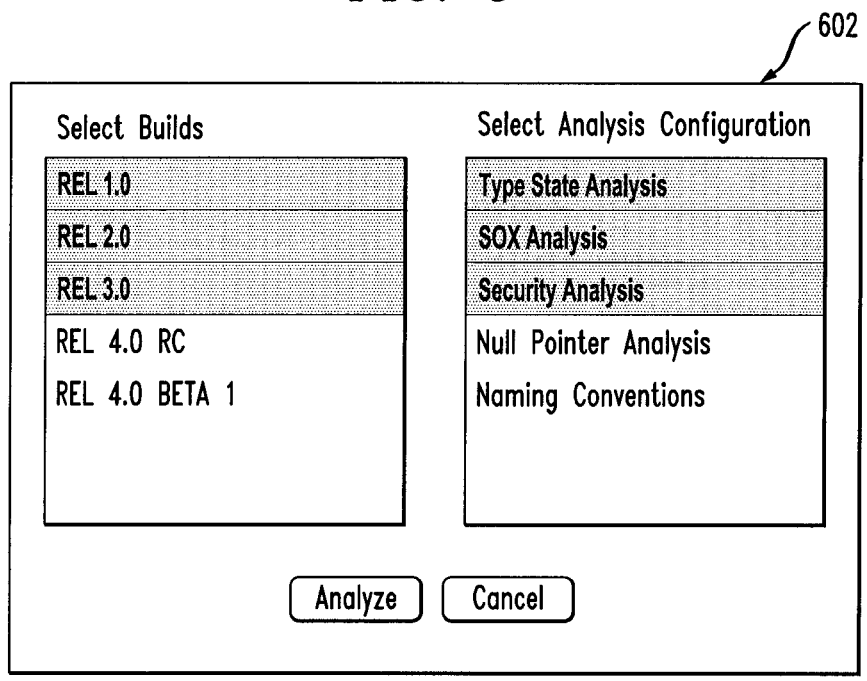
FIG. 6 is a diagram illustrating an end-user choosing the builds and the analysis configurations with which it intends to perform a Static-Code-Analysis, according to an embodiment of the invention.
Figure 7:
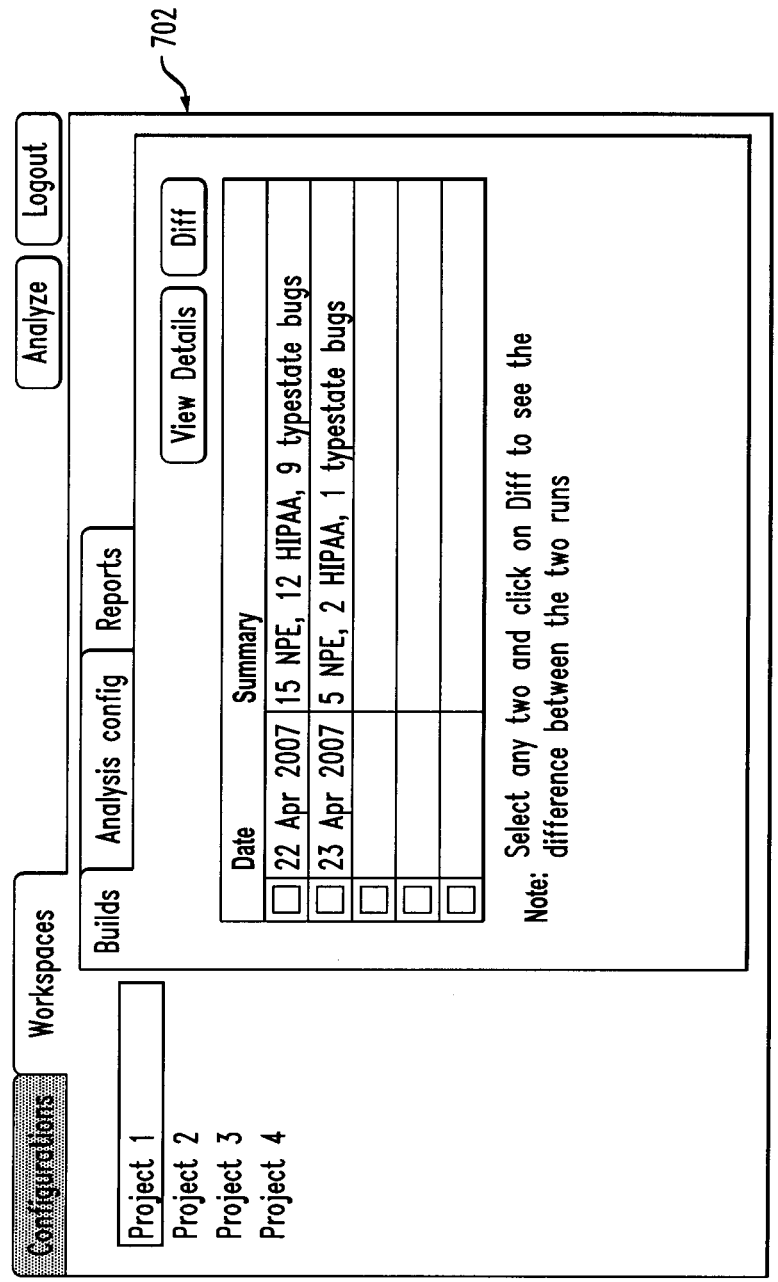
FIG. 7 is a diagram illustrating an end-user viewing analysis reports, according to an embodiment of the invention.

FIG. 5 is a diagram 502 illustrating an end-user specifying named analysis configurations, according to an embodiment of the invention, as described in further detail herein. FIG. 6 is a diagram 602 illustrating an end-user choosing the builds and the analysis configurations with which it intends to perform a static-code-analysis, according to an embodiment of the invention, as also described in further detail herein. FIG. 7 is a diagram 702 illustrating an end-user viewing analysis reports, according to an embodiment of the invention, as further described in detail herein.

Figure 8:
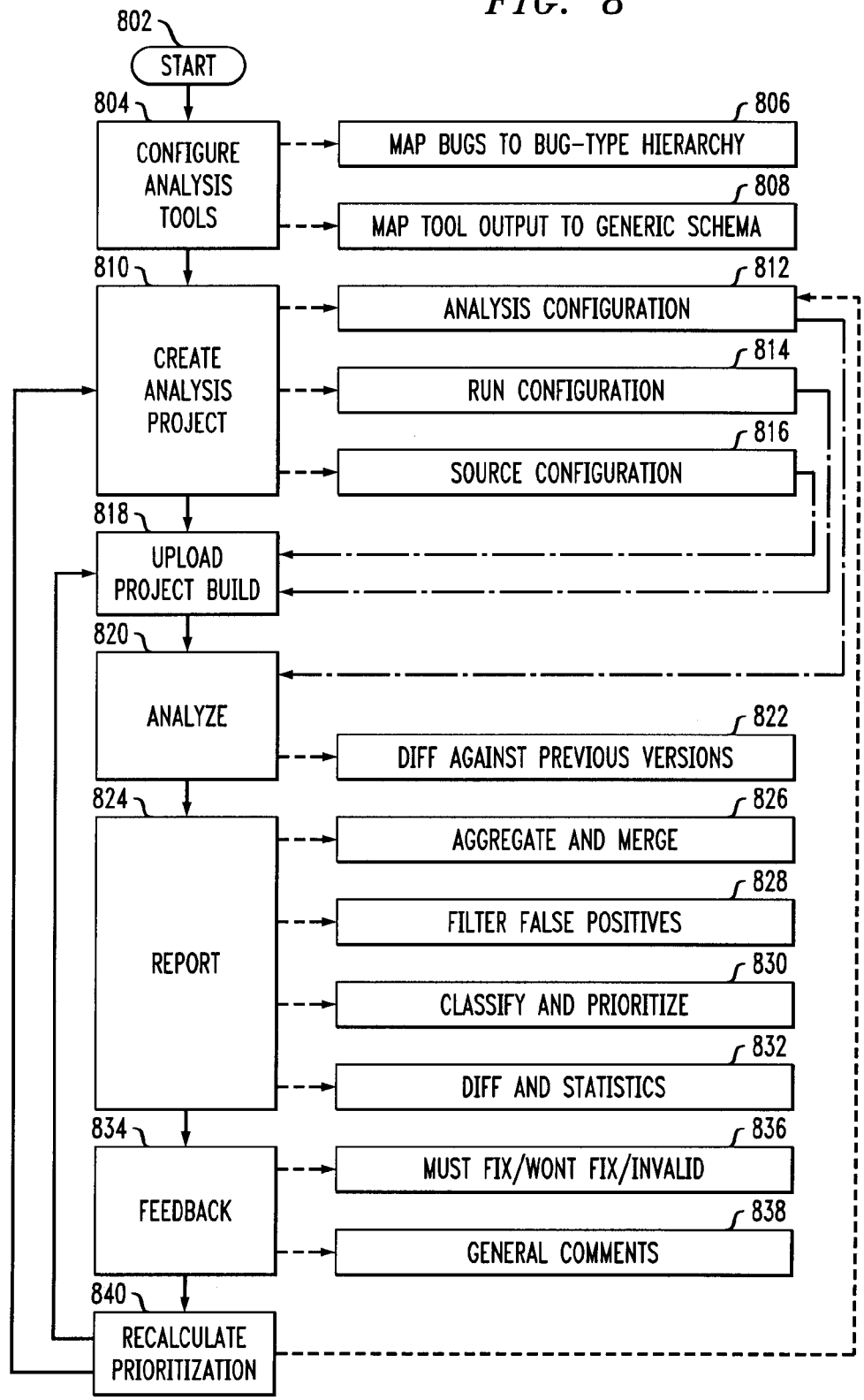
FIG. 8 is a diagram illustrating techniques for static code analysis, according to an embodiment of the invention.

FIG. 8 is a diagram illustrating techniques for static code analysis, according to an embodiment of the invention. As depicted in FIG. 8, step 802 includes starting the techniques. Step 804 includes configuring analysis tools, which is a one-time task that needs to be done each time a new analysis tool is added to the system. This step has two sub-components that aid in aggregating and merging the results from the various tools. Specifically, step 806 includes mapping bugs to bug-type hierarchy, wherein each defect that is detected by the tool is mapped either into the existing hierarchy of defect types or if necessary, the hierarchy may have to be extended. Also, step 808 includes mapping tool output to generic schema, wherein a script is written to convert the output of the tool to a standard scheme that can be understood by the system.

Step 810 includes creating an analysis project. Once the system is configured, the first task from a user perspective is to create a project where builds can be uploaded for analysis (see, for example, FIG. 9). This step has three sub-components. Specifically, step 812 includes analysis configuration, wherein project configurations can be set up that specify the defects and the defect priorities (see, for example, FIG. 10). Also, step 814 includes running configuration, wherein one can set up run-time schedules, according to which the system will extract the code specified in the source configuration and automatically generate reports. Additionally, step 816 includes source configuration, which indicates whether the source is to be uploaded manually, via downloaded scripts (such as ant, java, php, etc. scripts) or whether the source is to be collected from a source control system (such as svn, cvs, etc.).

Step 818 includes uploading a project build. Depending on the configured run and source configurations, this step can be accomplished manually via the portal, or semi-automatically via the upload scripts or completely automatically from a configured source control system (see, for example, FIG. 11). Step 820 includes analyzing, wherein one can run appropriate analysis tools based on the configured analysis configuration. Step 822 includes computing the "diff" between the current build and every previous build (see, for example, FIG. 12).

Figure 13:
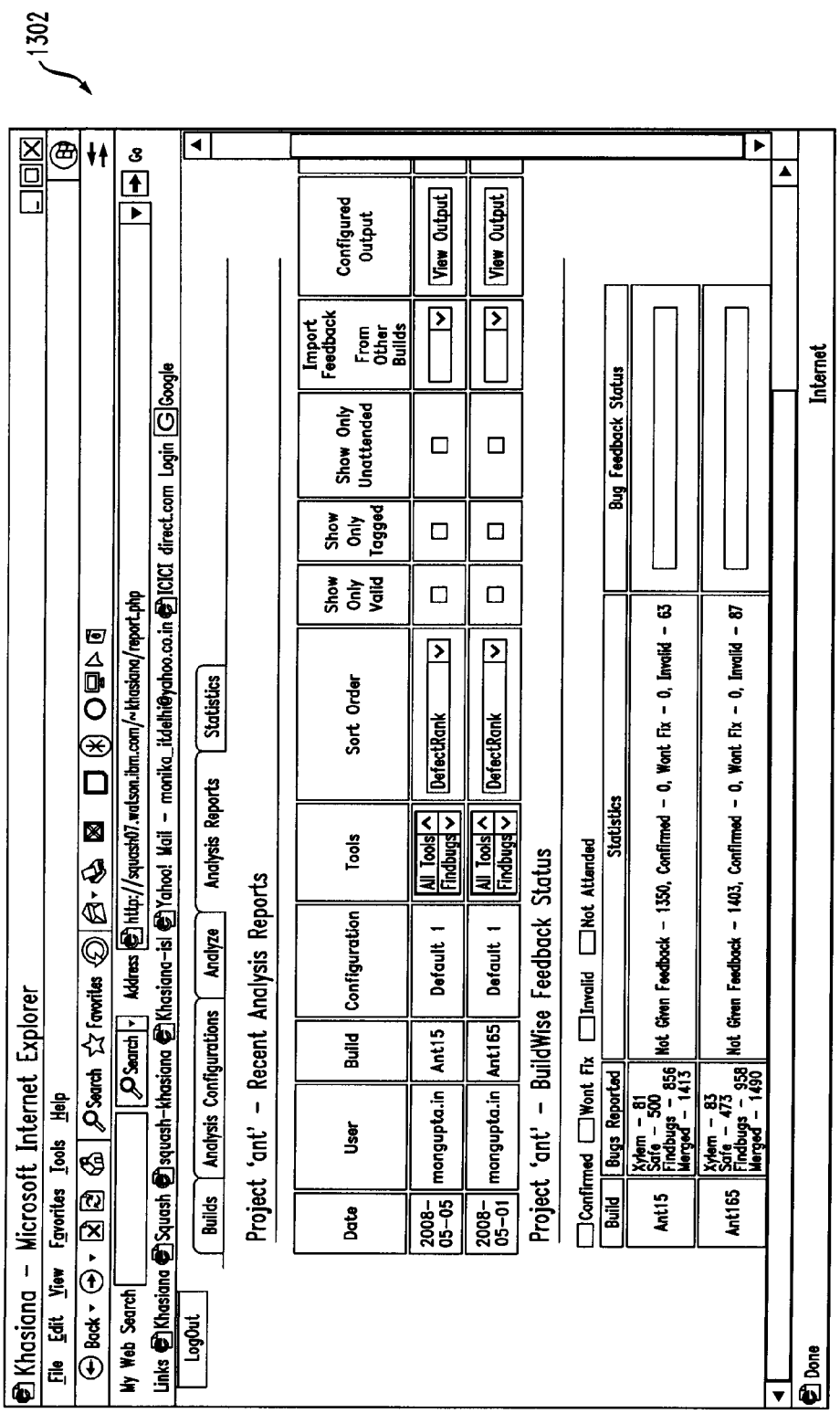
FIG. 13 is a diagram illustrating an example embodiment of "Aggregate and merge" and "Filter false positives," according to an embodiment of the invention.
Figure 14:
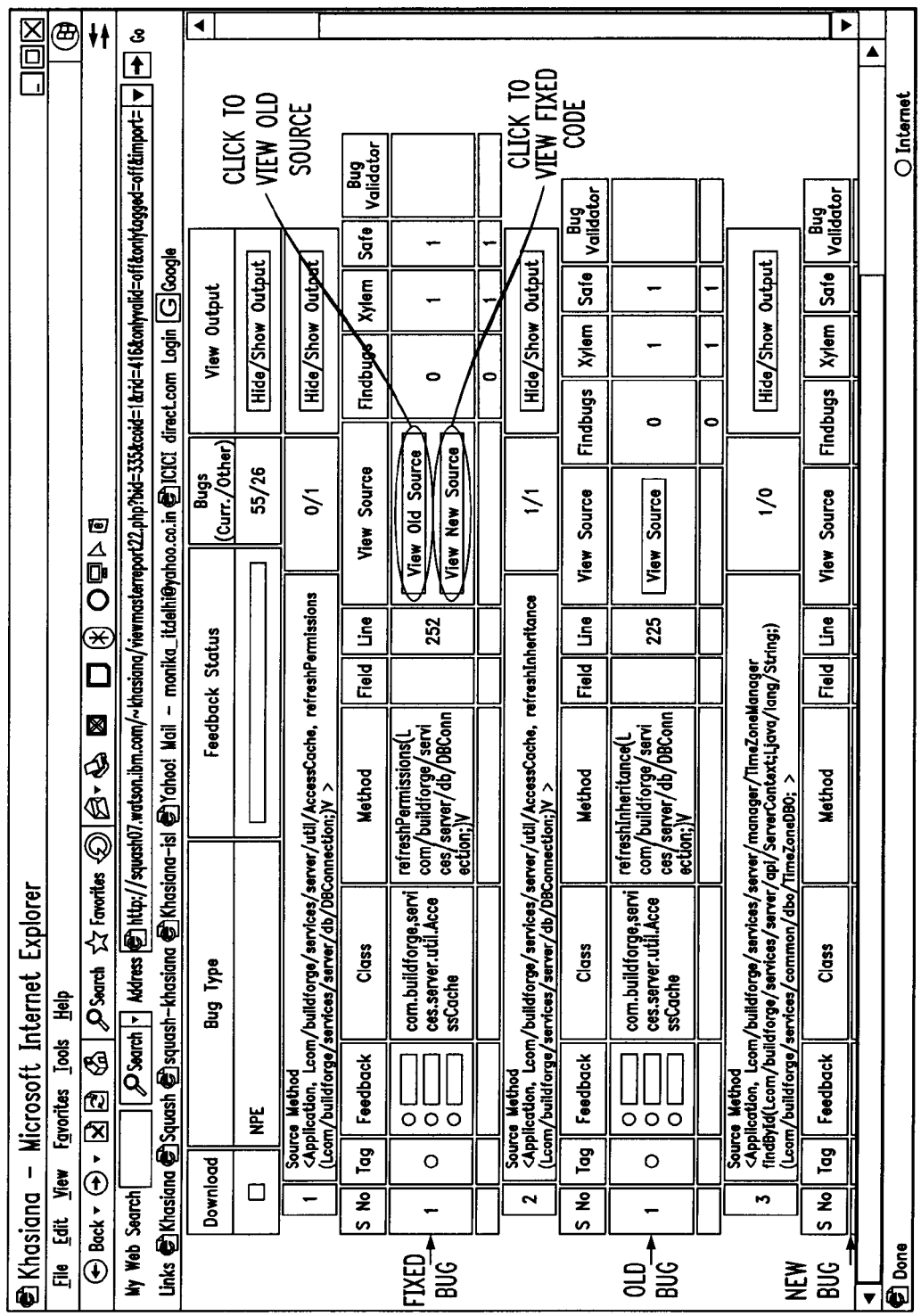
FIG. 14 is a diagram illustrating an example embodiment of "Diffs," according to an embodiment of the invention.
Figure 15:
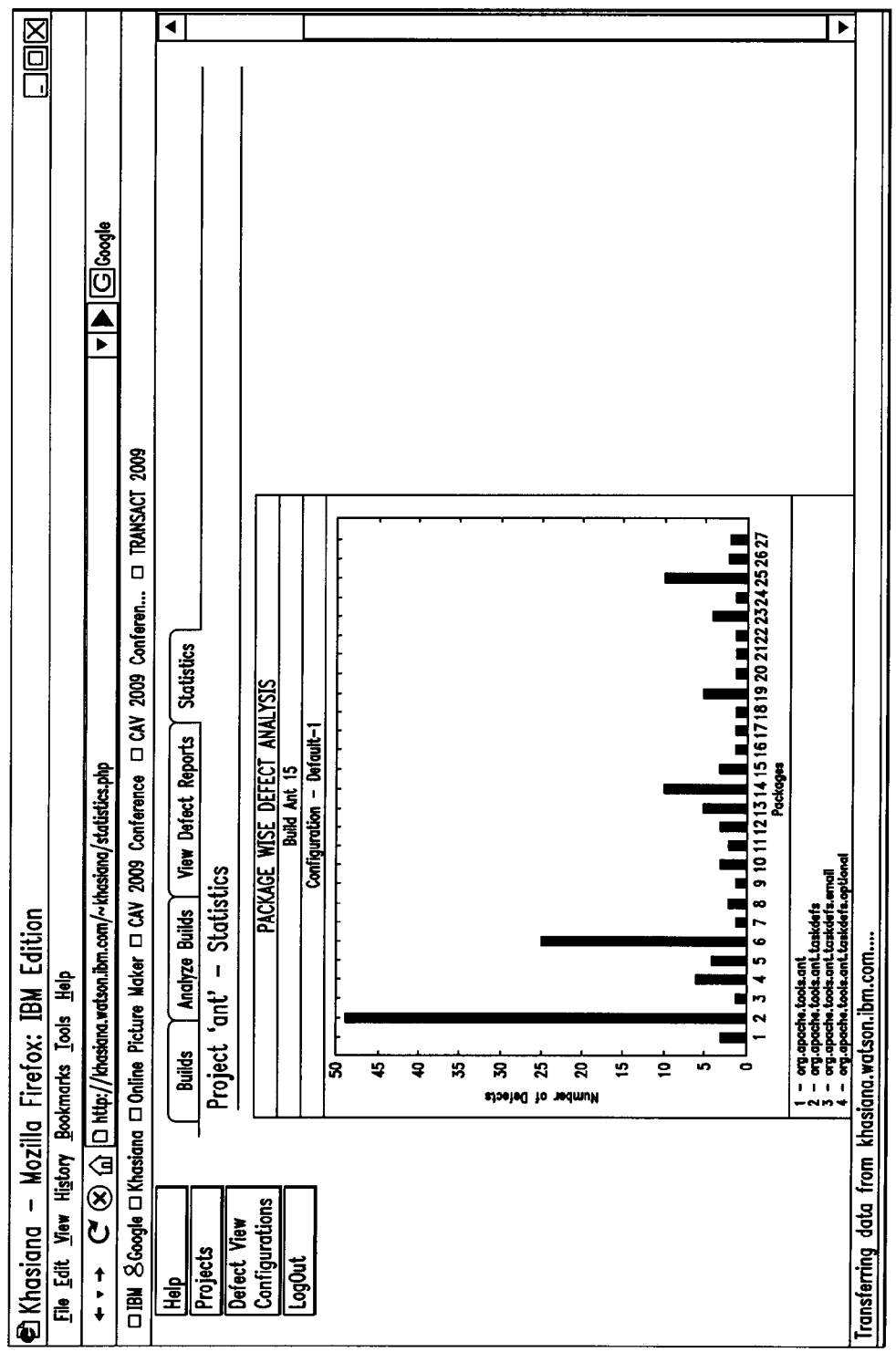
FIG. 15 is a diagram illustrating an example embodiment of "Statistics," according to an embodiment of the invention.

Step 824 includes reporting, wherein the analysis results can be displayed and/or e-mailed to the appropriate project member(s) (see, for example, FIG. 13, FIG. 14 and FIG. 15). Step 826 includes aggregating and merging, wherein the results from the various tools are aggregated and merged. Hence, the user need not look at multiple reports for the same defect (see, for example, FIG. 13). Step 828 includes filtering false positive, wherein deep analysis tool results can be used to invalidate some results from shallow analysis tools and mark them as false positives (see, for example, FIG. 13). Also, step 832 includes diff and statistics, wherein on request, diffs may be displayed (see, for example FIG. 14). Similarly, statistics may be computed and displayed (see, for example, FIG. 15).

Figure 16:
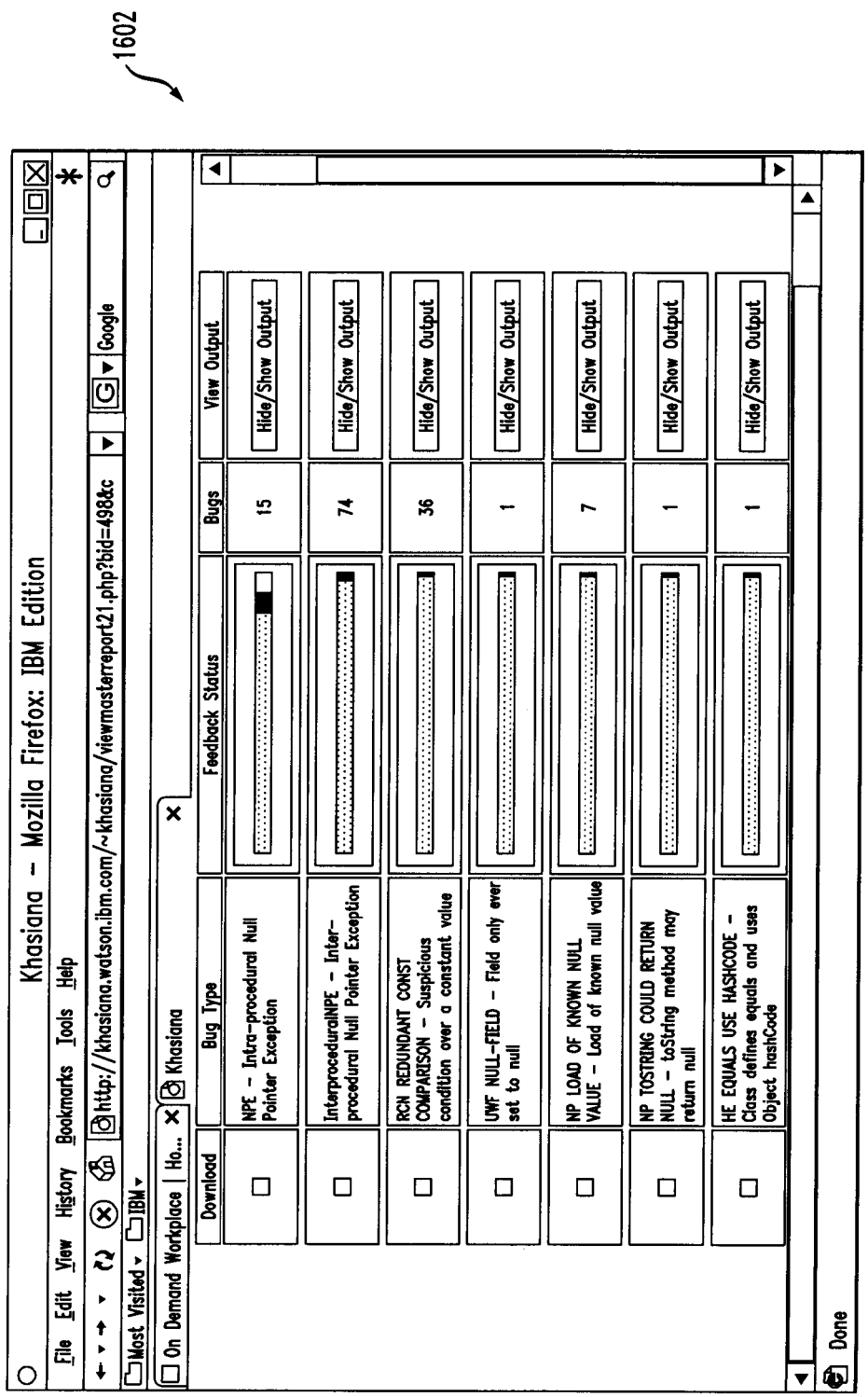
FIG. 16 is a diagram illustrating an example embodiment of "Classify and Prioritize," according to an embodiment of the invention.

Step 830 includes classifying and prioritizing, wherein all defects are classified and prioritized based on rules in the analysis configuration (see, for example, FIG. 16). Additionally, one or more embodiments of the invention include code navigation paths, which include the path along which a bug occurred can be displayed (see, for example, FIG. 16).

Step 834 includes providing and/or receiving feedback, wherein a user can give feedback on the value of each defect. Feedback can include, for example, must-fix, wont fix, invalid 836, which can be derived from defect reporting repositories (such as bugzilla, CMVC, etc.). Must-fix is a high priority bug that must be fixed as soon as possible. Wont-fix is recognized as a bug but the developer uses his discretion to ignore it. Invalid indicates a false positive as noted by human intelligence (see, for example, FIG. 18). Feedback can also include general comments 838, which can include free text comments that can be added to each defect reported.

Additionally, as depicted by FIG. 8, step 840 includes recalculating prioritization. Based on feedback, the defect prioritization can be recalculated and the analysis configuration can be updated accordingly.

Figure 9:
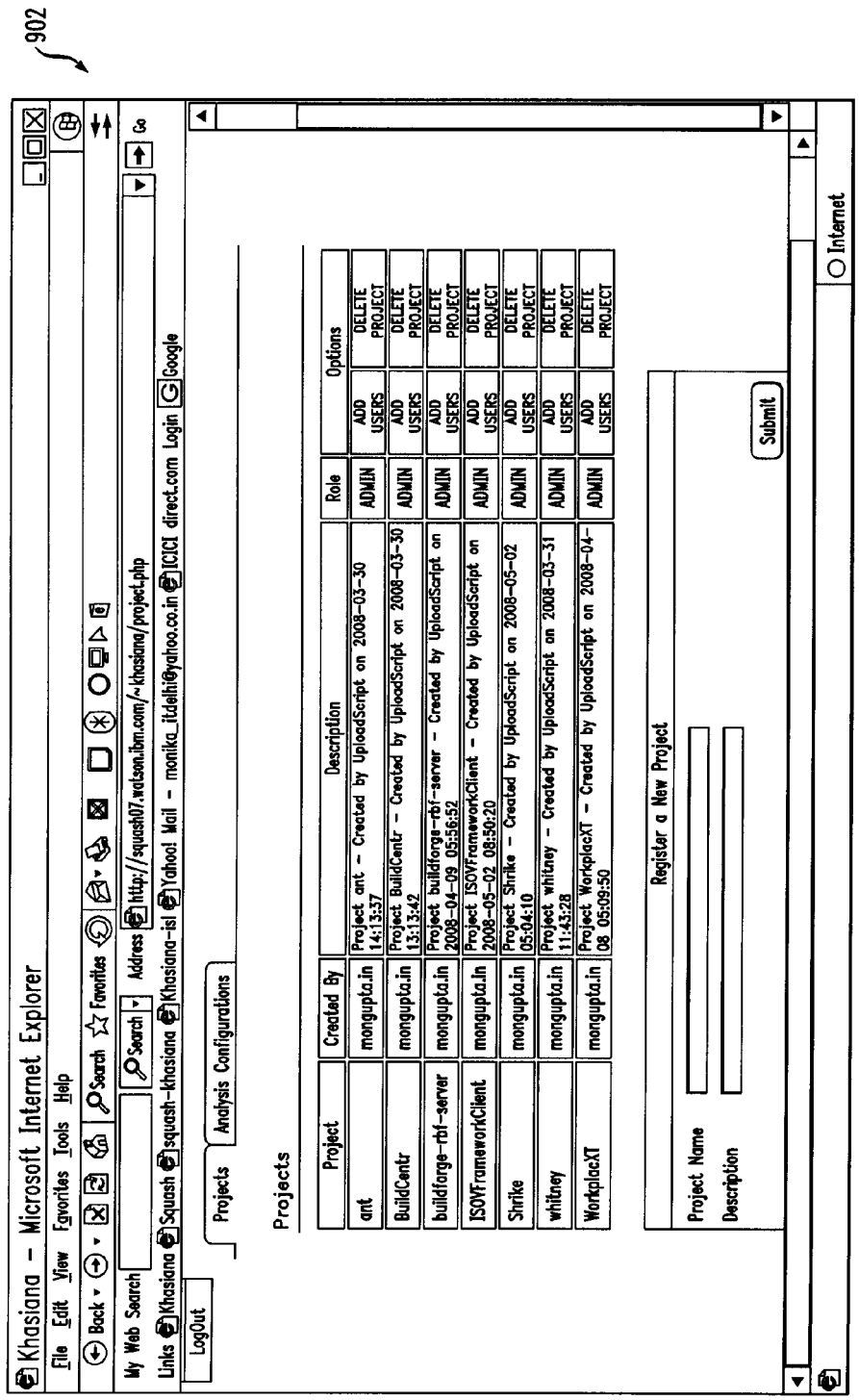
FIG. 9 is a diagram illustrating an example embodiment of "Create analysis project," according to an embodiment of the invention.
Figure 10:
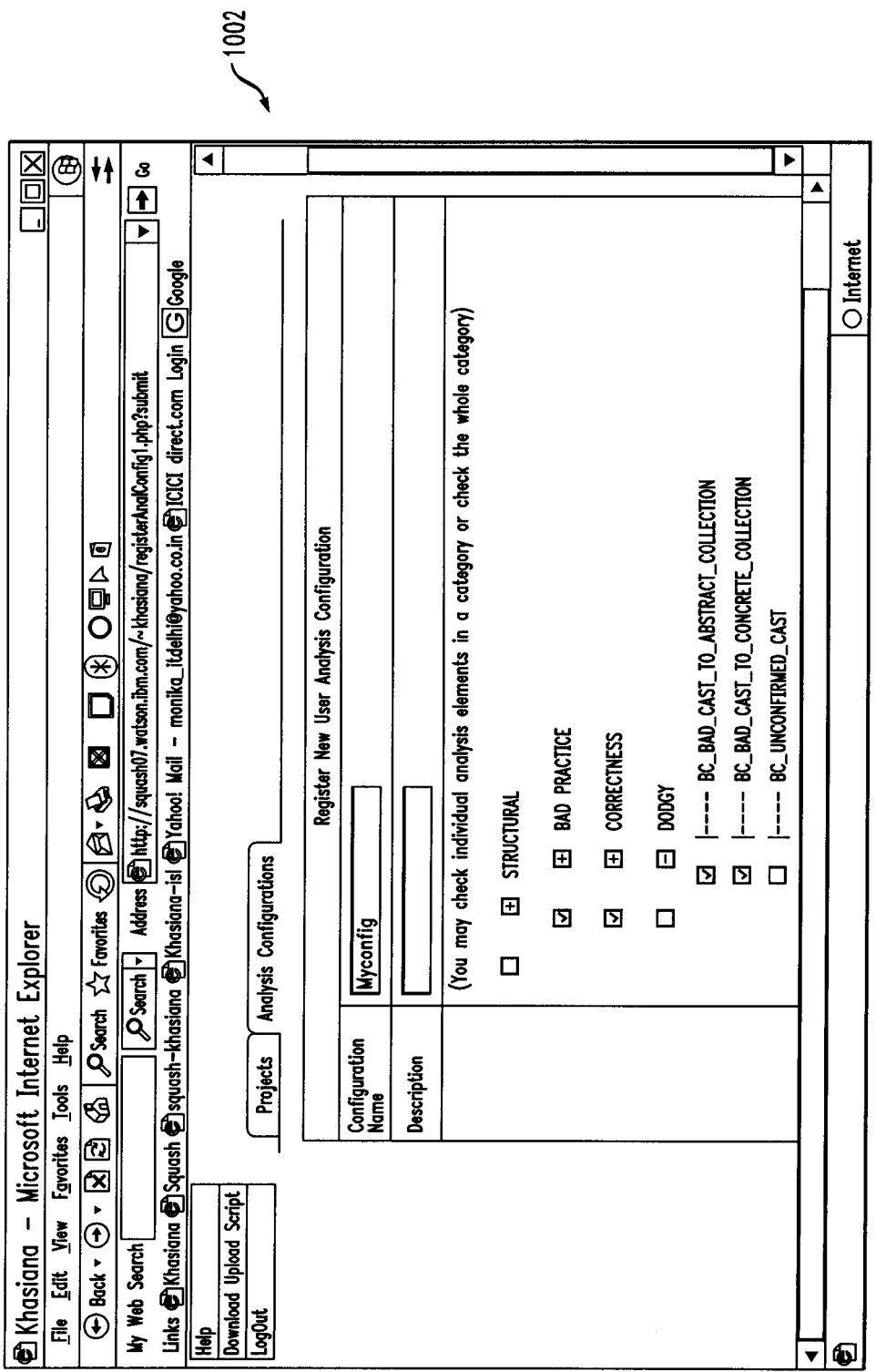
FIG. 10 is a diagram illustrating an example embodiment of "Analysis configuration," according to an embodiment of the invention.
Figure 11:
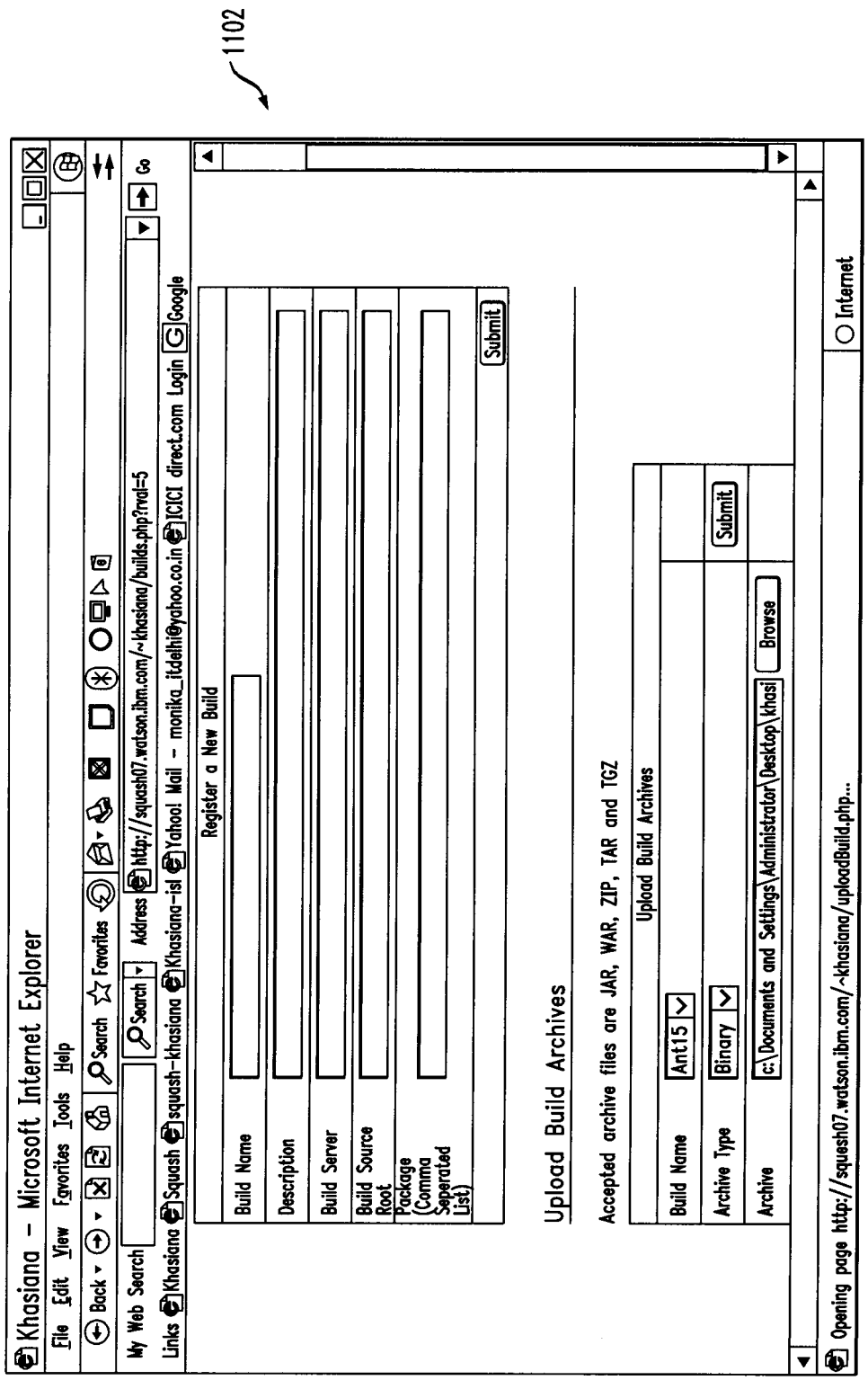
FIG. 11 is a diagram illustrating an example embodiment of "Upload project build," according to an embodiment of the invention.

FIGS. 9 through 18 illustrate aspects of the techniques depicted in FIG. 8, as noted above. FIG. 9 is a diagram illustrating an example embodiment 902 of "Create analysis project," according to an embodiment of the invention. FIG. 10 is a diagram illustrating an example embodiment 1002 of "Analysis configuration," according to an embodiment of the invention. FIG. 11 is a diagram illustrating an example embodiment 1102 of "Upload project build," according to an embodiment of the invention.

Figure 12:
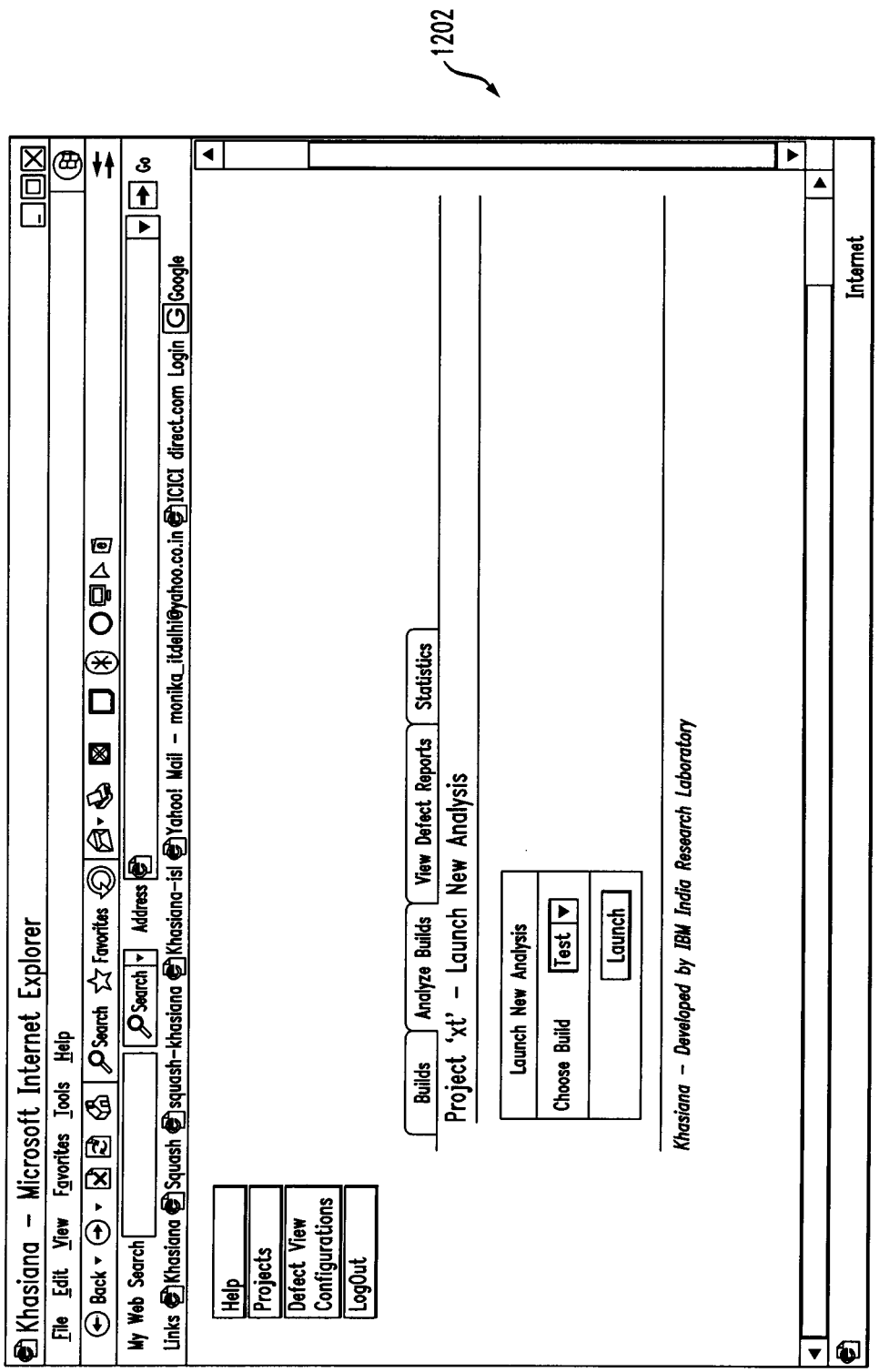
FIG. 12 is a diagram illustrating an example embodiment of "Analyze," according to an embodiment of the invention.

FIG. 12 is a diagram illustrating an example embodiment 1202 of "Analyze," according to an embodiment of the invention. In "Analyze," an analysis is run or launched on a particular project build. This task may be automated by upload scripts or directly via source and run configurations. FIG. 13 is a diagram illustrating an example embodiment 1302 of "Aggregate and merge" and "Filter false positives," according to an embodiment of the invention. FIG. 13 shows the number of defects reported by each tool and also the number of defects in the merged report. FIG. 13 also illustrates the number of "invalid" (false positive) defects automatically detected and filtered by the system.

FIG. 14 is a diagram illustrating an example embodiment 1402 of "Diffs," according to an embodiment of the invention. FIG. 14 depicts a fixed bug (that is, a bug that was there in a previous version, but has been fixed in the current version), an old bug (that is, a bug that was there in a previous version, and is also there in the current version), and a new bug (that is, a bug that was not there in a previous version, but has been found in the current version).

FIG. 15 is a diagram illustrating an example embodiment 1502 of "Statistics," according to an embodiment of the invention. FIG. 15 depicts defects detected per package. FIG. 16 is a diagram illustrating an example embodiment 1602 of "Classify and Prioritize," according to an embodiment of the invention. FIG. 16 depicts an example of defects ordered by the bug category ranking.

Figure 17:
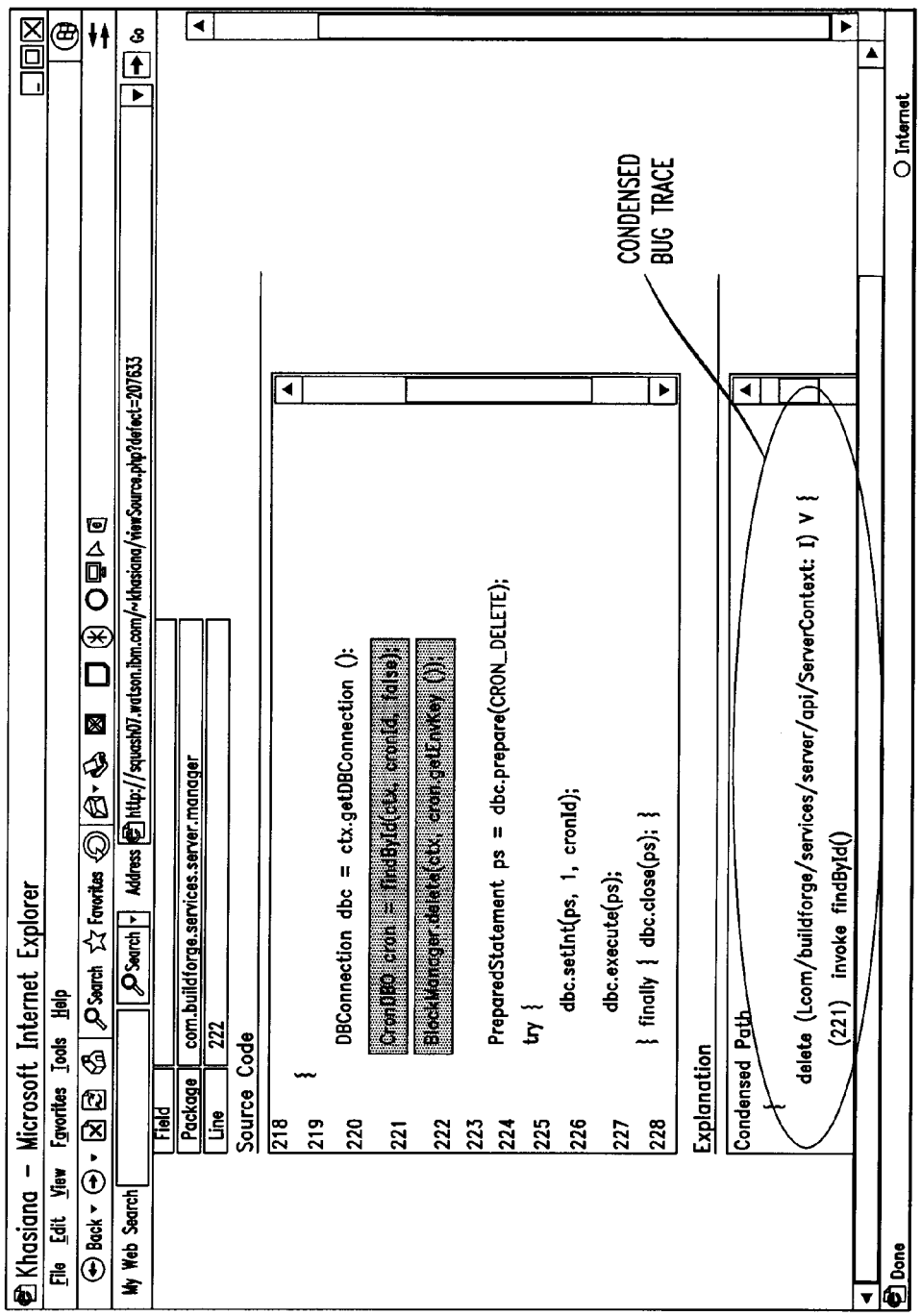
FIG. 17 is a diagram illustrating an example embodiment 1702 of "Code navigation paths," according to an embodiment of the invention.
Figure 18:
FIG. 18 is a diagram illustrating an example embodiment of "Must-fix, wont fix, invalid" feedback, according to an embodiment of the invention.

Also, FIG. 17 is a diagram illustrating an example embodiment 1702 of "Code navigation paths," according to an embodiment of the invention. FIG. 17 depicts an example of a defect path highlighted in the code (shaded). FIG. 18 is a diagram illustrating an example embodiment 1802 of "Must-fix, wont fix, invalid" feedback, according to an embodiment of the invention. FIG. 18 depicts radio buttons to accept such feedback.

Figure 19:
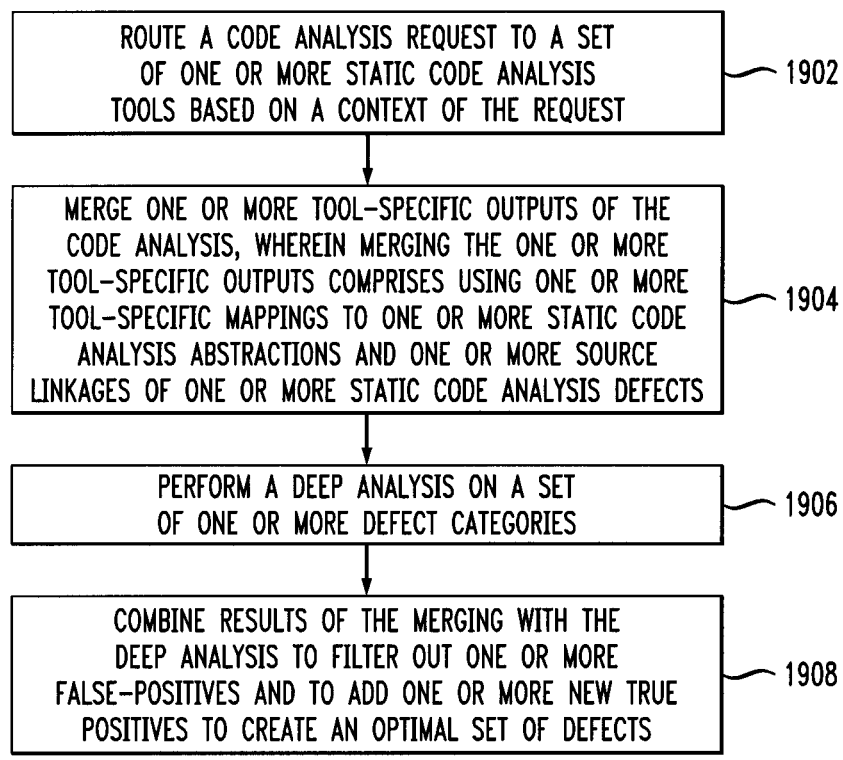
FIG. 19 is a flow diagram illustrating techniques for static code analysis, according to an embodiment of the invention.

FIG. 19 is a flow diagram illustrating techniques for static code analysis, according to an embodiment of the present invention. Step 1902 includes routing a code analysis request to a set (for example, a configured set) of one or more static code analysis tools based on a context of the request. Routing a code analysis request to a set of static code analysis tools can include, for example, implementing static code analysis tools and corresponding mappings into tool-agnostic code-analysis abstractions. A code-analysis abstraction defines terms (that is, vocabulary) in a static analysis domain from an end user's perspective (for example, masking the end users from tool specific intricacies).

Step 1904 includes merging one or more tool-specific outputs of the code analysis, wherein merging the one or more tool-specific outputs comprises using one or more tool-specific mappings to one or more static code analysis abstractions and one or more source linkages of one or more static code analysis defects. Merging tool-specific outputs of the code analysis can additionally include producing a unified analysis report.

Step 1906 includes performing a deep analysis on a set of one or more defect categories (wherein the defect categories are critical from a perspective of fixing the defects). Step 1908 includes combining results of the merging with the deep analysis to filter out one or more false-positives and to add one or more new true positives to create an optimal set of defects. Additionally, one or more embodiments of the invention include presenting the optimal set of defects to a user.

The techniques depicted in FIG. 19 also include filtering one or more merged defects based on, for example, an empirical prioritization, user-feedback (for example, on the reported defects in previous analysis-runs), and/or defect relevance trend-analysis based on user-feedback and configurations (for example, across users and projects). One or more embodiments of the invention can also include performing one or more additional pass code-analyses to search for code-patterns that led to a set of previously-filtered defects.

Additionally, the techniques depicted in FIG. 19 can include enabling a user (for example, via a service portal) to specify configuration, interact, see results, and/or provide feedback for static-analysis of code (for example, in a tool-agnostic manner). One or more embodiments of the invention can additionally include identifying elemental code patterns leading to refined defect categories (thereby achieving substantial reduction in false positives), as well as implementing a generalized code navigation scheme based on named-marker-sets.

The techniques depicted in FIG. 19 can also include, as described herein, providing a system, wherein the system includes distinct software modules, each of the distinct software modules being embodied on a tangible computer-readable recordable storage medium. The distinct software modules can include, for example, a static analysis portal module, a static code analysis service application programming interface module, a configurator module, an analysis driver module, an aggregation and merge engine module, a prioritize and filter engine module, a deep analyzer module, a categorizer module, a feedback engine module, an analysis tool module and a data store module executing on a hardware processor.

In one or more embodiments of the invention, configuring analysis tools can be performed by a configurator module, create an analysis project and uploading a project build can be performed by a static analysis portal front module, a static code analysis service API module, and the schema. Also, analyzing can be performed by an analysis driver module, aggregating and merging can be performed by an aggregation merge engine module, and filtering false positives can be performed by a deep analyzer module. Additionally, classifying and prioritizing can be performed by a prioritize and filter engine module, providing and receiving feedback can be performed by a feedback engine module, and recalculating prioritization can be performed by a prioritize and filter engine module.

Additionally, the techniques depicted in FIG. 19 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 20:
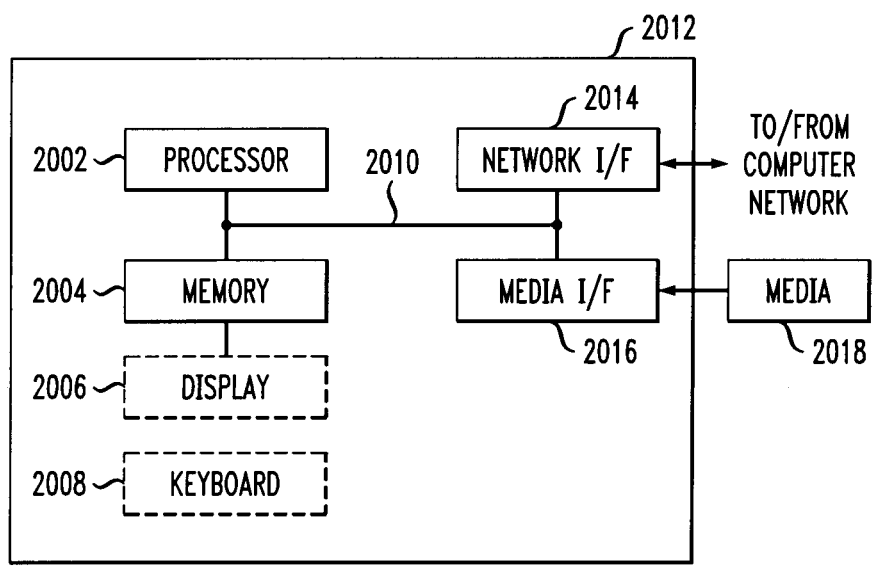
FIG. 20 is a system diagram of an exemplary computer system on which at least one embodiment of the invention can be implemented.

One or more embodiments can make use of software running on a general purpose computer or workstation. With reference to FIG. 20, such an implementation might employ, for example, a processor 2002, a memory 2004, and an input/output interface formed, for example, by a display 2006 and a keyboard 2008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 2002, memory 2004, and input/output interface such as display 2006 and keyboard 2008 can be interconnected, for example, via bus 2010 as part of a data processing unit 2012. Suitable interconnections, for example via bus 2010, can also be provided to a network interface 2014, such as a network card, which can be provided to interface with a computer network, and to a media interface 2016, such as a diskette or CD-ROM drive, which can be provided to interface with media 2018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 2018) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 2004), magnetic tape, a removable computer diskette (for example media 2018), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 2002 coupled directly or indirectly to memory elements 2004 through a system bus 2010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 2008, displays 2006, pointing devices, and the like) can be coupled to the system either directly (such as via bus 2010) or through intervening I/O controllers (omitted for clarity).

Network adapters such as network interface 2014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 2012 as shown in FIG. 20) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 1. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention provides one or more beneficial effects, such as, for example, filtering and prioritizing reported defects based on user feedback It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for static code analysis, wherein the method comprises:
    routing a code analysis request to a selected set of one or more static code analysis tools based on a context of the request, wherein the set of one or more static code analysis tools is selected based on a capability of each tool towards one or more categories of analysis included in the code analysis request;
    merging one or more tool-specific analysis outputs of the selected set of one or more static code analysis tools, wherein merging the one or more tool-specific outputs comprises using one or more tool-specific mappings to one or more static code analysis abstractions and one or more source linkages of one or more static code analysis defects;
    performing a deep analysis on a selected set of one or more defect categories request, wherein the set of one or more defect categories are selected based on an amount of false positives generated from the code analysis performed by the set of one or more static code analysis tools;
    combining results of the merging with results of the deep analysis to filter out one or more false-positives and to add one or more new true positives to create an optimal set of defects; and
    re-configuring the selected set of one or more static code analysis tools for a subsequent code analysis request, wherein said re-configuring is based on tool-specific user feedback.

2. The method of claim 1, wherein routing a code analysis request to a set of one or more static code analysis tools comprises implementing one or more static code analysis tools and one or more corresponding mappings into one or more tool-agnostic code-analysis abstractions.

3. The method of claim 2, wherein a code-analysis abstraction defines one or more terms in a static analysis domain from an end user's perspective.

4. The method of claim 1, wherein merging one or more tool-specific outputs of the code analysis further comprises producing a unified analysis report.

5. The method of claim 1, further comprising filtering one or more merged defects based on an empirical prioritization.

6. The method of claim 1, further comprising filtering one or more merged defects based on user-feedback.

7. The method of claim 1, further comprising filtering one or more merged defects based on defect relevance trend-analysis based on user-feedback and one or more configurations.

8. The method of claim 1, further comprising enabling a user to at least one of interact, see one or more results, and provide feedback for static-analysis of code.

9. The method of claim 1, wherein the one or more defect categories are used to fix the defects.

10. The method of claim 1, further comprising presenting the optimal set of defects to a user.

11. The method of claim 1, wherein the method is run on a system, wherein the system comprises one or more distinct software modules, each of the one or more distinct software modules being embodied on a tangible computer-readable recordable storage medium, and wherein the one or more distinct software modules comprise a static analysis portal module, a static code analysis service application programming interface module, a configurator module, an analysis driver module, an aggregation and merge engine module, a prioritize and filter engine module, a deep analyzer module, a categorizer module, a feedback engine module, an analysis tool module and a data store module executing on a hardware processor.

12. A computer program product comprising a tangible computer readable recordable storage device including computer useable program code for static code analysis, the computer program product including:
    computer useable program code for routing a code analysis request to a selected set of one or more static code analysis tools based on a context of the request, wherein the set of one or more static code analysis tools is selected based on a capability of each tool towards one or more categories of analysis included in the code analysis request;
    computer useable program code for merging one or more tool-specific analysis outputs of the selected set of one or more static code analysis tools, wherein merging the one or more tool-specific outputs comprises using one or more tool-specific mappings to one or more static code analysis abstractions and one or more source linkages of one or more static code analysis defects;
    computer useable program code for performing a deep analysis on a selected set of one or more defect categories request, wherein the set of one or more defect categories are selected based on an amount of false positives generated from the code analysis performed by the set of one or more static code analysis tools;
    computer useable program code for combining results of the merging with results of the deep analysis to filter out one or more false-positives and to add one or more new true positives to create an optimal set of defects; and
    computer useable program code for re-configuring the selected set of one or more static code analysis tools for a subsequent code analysis request, wherein said re-configuring is based on tool-specific user feedback.

13. The computer program product of claim 12, wherein the computer useable program code for routing a code analysis request to a set of one or more static code analysis tools comprises computer useable program code for implementing one or more static code analysis tools and one or more corresponding mappings into one or more tool-agnostic code-analysis abstractions.

14. The computer program product of claim 12, further comprising:
    computer useable program code for filtering one or more merged defects, wherein filtering the one or more merged defects comprises filtering the one or more merged defects based on at least one of an empirical prioritization, on user-feedback, and defect relevance trend-analysis based on user-feedback and one or more configurations.

15. The computer program product of claim 12, further comprising:
computer useable program code for presenting the optimal set of defects to a user.

16. The computer program product of claim 12, wherein the computer usable program code comprises one or more distinct software modules, and wherein the one or more distinct software modules comprise a static analysis portal module, a static code analysis service application programming interface module, a configurator module, an analysis driver module, an aggregation and merge engine module, a prioritize and filter engine module, a deep analyzer module, a categorizer module, a feedback engine module, an analysis tool module and a data store module executing on a hardware processor.

17. A system for static code analysis, comprising:
a memory; and
at least one processor coupled to the memory and operative to:
route a code analysis request to a selected set of one or more static code analysis tools based on a context of the request, wherein the set of one or more static code analysis tools is selected based on a capability of each tool towards one or more categories of analysis included in the code analysis request;
merge one or more tool-specific analysis outputs of the selected set of one or more static code analysis tools, wherein merging the one or more tool-specific outputs comprises using one or more tool-specific mappings to one or more static code analysis abstractions and one or more source linkages of one or more static code analysis defects;
perform a deep analysis on a selected set of one or more defect categories request, wherein the set of one or more defect categories are selected based on an amount of false positives generated from the code analysis performed by the set of one or more static code analysis tools;
combine results of the merging with results of the deep analysis to filter out one or more false-positives and to add one or more new true positives to create an optimal set of defects; and
re-configure the selected set of one or more static code analysis tools for a subsequent code analysis request, wherein said re-configuring is based on tool-specific user feedback.

18. The system of claim 17, wherein the at least one processor coupled to the memory is further operative to:
filter one or more merged defects, wherein filtering one or more merged defects comprises filtering one or more merged defects based on at least one of an empirical prioritization, user-feedback, and defect relevance trend-analysis based on user-feedback and one or more configurations.

19. The system of claim 17, wherein the at least one processor coupled to the memory is further operative to:
present the optimal set of defects to a user.

20. The system of claim 17, further comprising a tangible computer-readable recordable storage medium having one or more distinct software modules embodied thereon, the one or more distinct software modules comprising a static analysis portal module, a static code analysis service application programming interface module, a configurator module, an analysis driver module, an aggregation and merge engine module, a prioritize and filter engine module, a deep analyzer module, a categorizer module, a feedback engine module, an analysis tool module and a data store module executing on a hardware processor.

* * * * *